United States Patent
Bufe et al.

(10) Patent No.: US 8,665,830 B2
(45) Date of Patent: Mar. 4, 2014

(54) METHODS, APPARATUSES, RELATED COMPUTER PROGRAM PRODUCT AND DATA STRUCTURE FOR DECIDING ON A SIGNALING SCHEME FOR HANDOVER

(75) Inventors: Andreas Bufe, Neuried (DE); Woonhee Hwang, Espoo (FI); Michael Schopp, Ulm (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/516,399

(22) PCT Filed: Dec. 15, 2009

(86) PCT No.: PCT/EP2009/067218
§ 371 (c)(1),
(2), (4) Date: Jul. 24, 2012

(87) PCT Pub. No.: WO2011/072726
PCT Pub. Date: Jun. 23, 2011

(65) Prior Publication Data
US 2012/0287902 A1    Nov. 15, 2012

(51) Int. Cl.
*H04W 4/00* (2009.01)
*H04W 36/00* (2009.01)

(52) U.S. Cl.
USPC .......................................... 370/331; 455/436

(58) Field of Classification Search
None
See application file for complete search history.

(56) References Cited

U.S. PATENT DOCUMENTS

| | | | | |
|---|---|---|---|---|
| 6,522,880 | B1 * | 2/2003 | Verma et al. | 455/436 |
| 7,016,325 | B2 * | 3/2006 | Beasley et al. | 370/331 |
| 8,169,968 | B1 * | 5/2012 | Stegall et al. | 370/331 |
| 2002/0067707 | A1 * | 6/2002 | Morales et al. | 370/331 |
| 2005/0130660 | A1 * | 6/2005 | Park et al. | 455/436 |
| 2010/0008259 | A1 * | 1/2010 | Yoon et al. | 370/254 |
| 2011/0032904 | A1 * | 2/2011 | Morales et al. | 370/331 |

FOREIGN PATENT DOCUMENTS

WO  WO 2008/118388 A1  10/2008
WO  WO 2008/157717 A1  12/2008

OTHER PUBLICATIONS

R2-095559, 3GPP TSG-RAN WG2 Meeting #67bis, Miyazaki, Japan, Oct. 12-16, 2009, "Rel-9 Delta signaling handling", Nokia Siemens Networks, 3 pgs.
Tdoc R2-095797, 3GPP TSG-RAN WG2 #67bis, Miyazaki, Japan, Oct. 12-16, 2009, "Compatibility handling at intra-LTE HO", Ericsson, ST-Ericsson, 4 pgs.
R2-095856, 3GPP TSG-RAN Wg2 Meeting #67bis, Miyazaki, Japan, Oct. 12-16, 2009, "Backward compatibility of RRC reconfiguration during HO", Alcatel-Lucent, 3 pgs.

(Continued)

*Primary Examiner* — Clemence Han
(74) *Attorney, Agent, or Firm* — Harrington & Smith

(57) ABSTRACT

A first method (and related first apparatus) includes transmitting, in a handover request message, an indication of a first protocol version; a second method (and related second apparatus) includes receiving, in the handover request message, the indication, deciding, based on the received indication and a second protocol version, on a value of an information element included in a handover request acknowledgement message to be transmitted, the information element indicating usage of a first or second signaling schemes, and transmitting the handover request acknowledgement message including the information element; and in the first method receiving the handover request acknowledgement message including the information element; and a third method (and related third apparatus) including receiving the handover command message including the information element, and configuring according to one of the first and second signaling schemes indicated by the information element.

32 Claims, 3 Drawing Sheets

(56) References Cited

OTHER PUBLICATIONS

Tdoc R2-096746, 3GPP TSG-RAN WG2 #68, Jeju, South Korea, Nov. 9-13, 2009, "Further considerations on compatibility at intro-LYE HO", Ericsson, ST-Ericsson, 2 pgs.

3GPP TS 36.300 V8.9.0 (Jun. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (159 pages).

Nokia Siemens Networks; "Rel-9 Delta signalling handling"; 3GPP Draft; R2-095559; 3GPP TSG-RAN WG2 Meeting #67bis; Miyazaki, Japan; Oct. 12-16, 2009; whole document (4 pages); 3rd Generation Partnership Project (3GPP), Mobile Competence Centre 650, Route des Lucioles; F-06921 Sophia-Antipolis Cedex; France.

* cited by examiner

METHODS, APPARATUSES, RELATED COMPUTER PROGRAM PRODUCT AND DATA STRUCTURE FOR DECIDING ON A SIGNALING SCHEME FOR HANDOVER

FIELD OF THE INVENTION

An example of the present invention relates to deciding on a signaling scheme for handover. More specifically, the example of the present invention relates to methods, apparatuses, a related computer program product and a data structure for deciding on a signaling scheme for handover. The example of the present invention may be applicable e.g. to intra-long term evolution (LTE) and inter-evolved node B (eNB) handover in the $3^{rd}$ generation partnership project (3GPP).

BACKGROUND

In LTE Release 8 (Rel-8), e.g. for reducing the size or configuration of handover command message (e.g. radio resource controller (RRC) connection reconfiguration message), 3GPP decided to use the so-called delta signaling. This means that in case a target eNB does not include e.g. a parameter in the handover command, a user equipment (UE) may assume that the parameter or function will continue after the handover.

However, in the current universal mobile telecommunication system (UMTS) (e.g. so-called 3G system), e.g. the so-called inter-radio network controller (RNC) handover does not use this kind of scheme, but in case of a UE involving e.g. radio network system (RNS) relocation (e.g. hard handover), a target RNC may constructs a handover command message based on the radio access bearer (RAB) information. This means that the target RNC may explicitly include parameters to be used after the handover.

There have been approaches dedicated to solve the above issues.

For example, a full signaling configuration may be used. However, in 3GPP, there are no considerations on how the target eNB may choose usage of either a so-called delta signaling or full signaling.

However, the delta signaling assumes that the source eNB and the target eNB are using the same RRC protocol release or target eNB RRC protocol release is newer than the one of the source eNB. However, e.g. in case that the target eNB RRC protocol release is earlier than that of the source eNB, an additional rule may be required because by no means can the target eNB continue a later release functionality after the handover. Thus, all additional functionality and parameters defined in later release may be released.

In consideration of the above, according to the example of the present invention, methods, apparatuses, a related computer program product and a data structure for deciding on a signaling scheme for handover are provided.

In this connection, the examples of the present invention enable one or more of the following:

Specifying a logic for the target eNB to choose usage of either delta signaling or full signaling;
Enabling a parameter exchange to assist the target eNB in making the above decision;
Avoiding a complicated network, and thus, avoiding a complicated operation and management (O&M) configuration effort;
Providing a simple logic for the target eNB dealing on when to use delta signaling and when to use full configuration signaling.

BRIEF DESCRIPTION OF THE DRAWINGS

The examples of the present invention are described herein below with reference to the accompanying drawings, in which.

DETAILED DESCRIPTION OF THE EXAMPLE OF THE PRESENT INVENTION

The example of the present invention is described herein below by way of example with reference to the accompanying drawings.

It is to be noted that for this description, the terms "protocol release; at least one bit; radio resource control connection reconfiguration message; radio resource control protocol; full signaling; and delta signaling" are examples for "protocol version; information element; the message to be sent to UE to command the handover; first and second protocols; signaling scheme using handover command messages of full configuration (e.g. parameters); and signaling scheme using handover command messages of reduced configuration", respectively, without restricting the latter-named terms to the special technical or implementation details imposed to the first-named terms.

Figure 1:
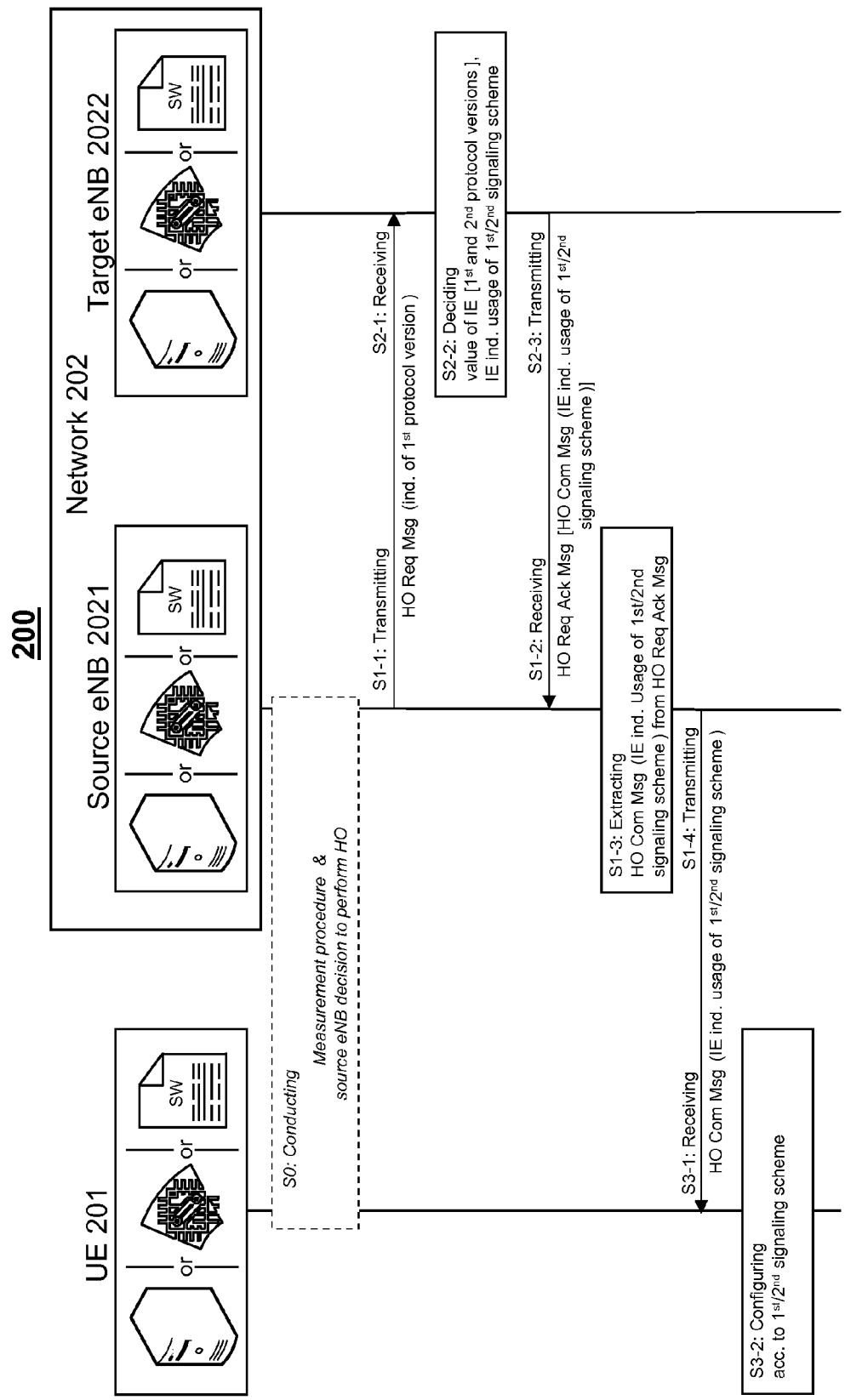
FIG. 1 shows methods for deciding on a signaling scheme for handover according to an example of the present invention.

FIG. 1 shows the methods for deciding on a signaling scheme for handover according to the example of the present invention. Signaling between elements may be indicated in horizontal direction, while time aspects between signaling may be reflected in the vertical arrangement of the signaling sequence as well as in the sequence numbers. It is to be noted that the time aspects indicated in FIG. 1 do not necessarily restrict any one of the method steps shown to the step sequence outlined. This applies in particular to method steps that are functionally disjunctive with each other. Within FIG. 1, for ease of description, means or portions which may provide main functionalities are depicted with solid functional blocks or arrows and/or a normal font, while means or portions which may provide optional functions are depicted with dashed functional blocks or arrows and/or an italic font.

As shown in FIG. 1, a communication system 200 may comprise a UE 201 and a network 202. In turn, the network 202 may further comprise a source eNB 2021 and a target eNB 2022, the terms "target" and "source" relating e.g. to a handover relationship between the eNBs 2021, 2022.

At the beginning, in an optional preparatory step S0, e.g. the UE 201 and the source eNB 2021 may perform conducting a measurement procedure and a decision of the source eNB 2021 to perform a handover (HO).

Further, as shown in FIG. 1, in step S1-1, e.g. the source eNB 2021 may perform transmitting, in a handover request message, an indication (e.g. enumerated information element) of a first protocol version (e.g. RRC protocol version of the source eNB 2021). Then, in step S2-1, e.g. the target eNB 2022 may perform receiving, in the handover request message, the indication of a first protocol version.

In step S2-2, e.g. the target eNB 2022 may perform deciding, based on the received indication (e.g. RRC indication) of the first protocol version and a second protocol version (e.g. RRC protocol version of the target eNB 2022), on a value of an information element (e.g. one bit) comprised in a handover request acknowledgement message (e.g. RRC connection reconfiguration message which may be encapsulated in a handover request acknowledgement message) to be transmitted, the information element indicating usage of one of a first signaling scheme (e.g. delta signaling) and a second signaling scheme (e.g. full signaling) different from the first signaling scheme.

And, in step S2-3, e.g. the target eNB 2022 may perform transmitting the handover request acknowledgement message (which may contain RRC Connection Reconfiguration message) comprising the information element indicating usage of the one of the first and second signaling (e.g. delta signaling or full signaling) schemes. Accordingly, in step S1-2, e.g. the source eNB 2021 may perform receiving, responsive to the transmitting in step S1-1, the handover request acknowledgement message (e.g. containing RRC Connection Reconfiguration message) comprising the information element indicating usage of one of the first signaling scheme and the second signaling scheme, the usage of the one of the first and second signaling schemes having been decided based on the first protocol version and the external second protocol version.

In an optional step S1-3, e.g. the source eNB 2021 may perform extracting a handover command message from the received handover request acknowledgement message, the handover command message comprising the information element.

Then, in step S1-4, e.g. the source eNB 2021 may perform transmitting, after the receiving, the handover command message (e.g. RRC Connection Reconfiguration message) to a user equipment (e.g. UE 201).

Finally, in step S3-2, e.g. the UE 201 may perform receiving the handover command message comprising the information element. And, in step S3-2, e.g. the UE 201 may perform configuring according to the first or the second signaling scheme indicated by the information element.

As for developments pertaining to the target eNB 2022, the deciding may be performed during a handover preparation. Further, the indication of the first protocol version (e.g. RRC protocol version of the source eNB 2021) may be comprised in a radio resource control container, or may be signaled in an X2/S1 application signaling protocol.

As for developments pertaining to both the source eNB 2021 and the target eNB 2022, the first signaling scheme may utilize a radio resource control container defined in radio resource control specification (e.g. handover preparation information messages). In that case, the information element may be set to affirmative. Further in this case, the first protocol version (e.g. RRC protocol version of the source eNB 2021) may be higher than the second protocol version (e.g. RRC protocol version of the target eNB 2022). Alternatively, the second signaling scheme may utilize a message defined in X2 application protocol specification (e.g. handover request message) or S1 application protocol specification. (e.g. handover required message) In that case, the information element may be set to non-affirmative. Further in this case, the first protocol version may be equal to or lower than the second protocol version. However, the same information should be transferred from the source eNB 2021 to the target eNB 2022 regardless the signaling scheme. Further, the protocol version may be constituted by a protocol release. In addition, the information element may be constituted by at least one bit. Still further, the handover request acknowledgement message may be constituted by or may encapsulate a radio resource control connection reconfiguration message. Moreover, the first protocol may be constituted by a radio resource control protocol of a handover source entity, while the indication of the first protocol version may be an enumerated information element. Further, the second protocol may constituted by a radio resource control protocol of a handover target entity. Finally, the handover command messages of full configuration or of delta configuration may be constituted by radio resource control connection reconfiguration messages, while the radio resource control container may be constituted by a handover preparation information message.

Figure 2:
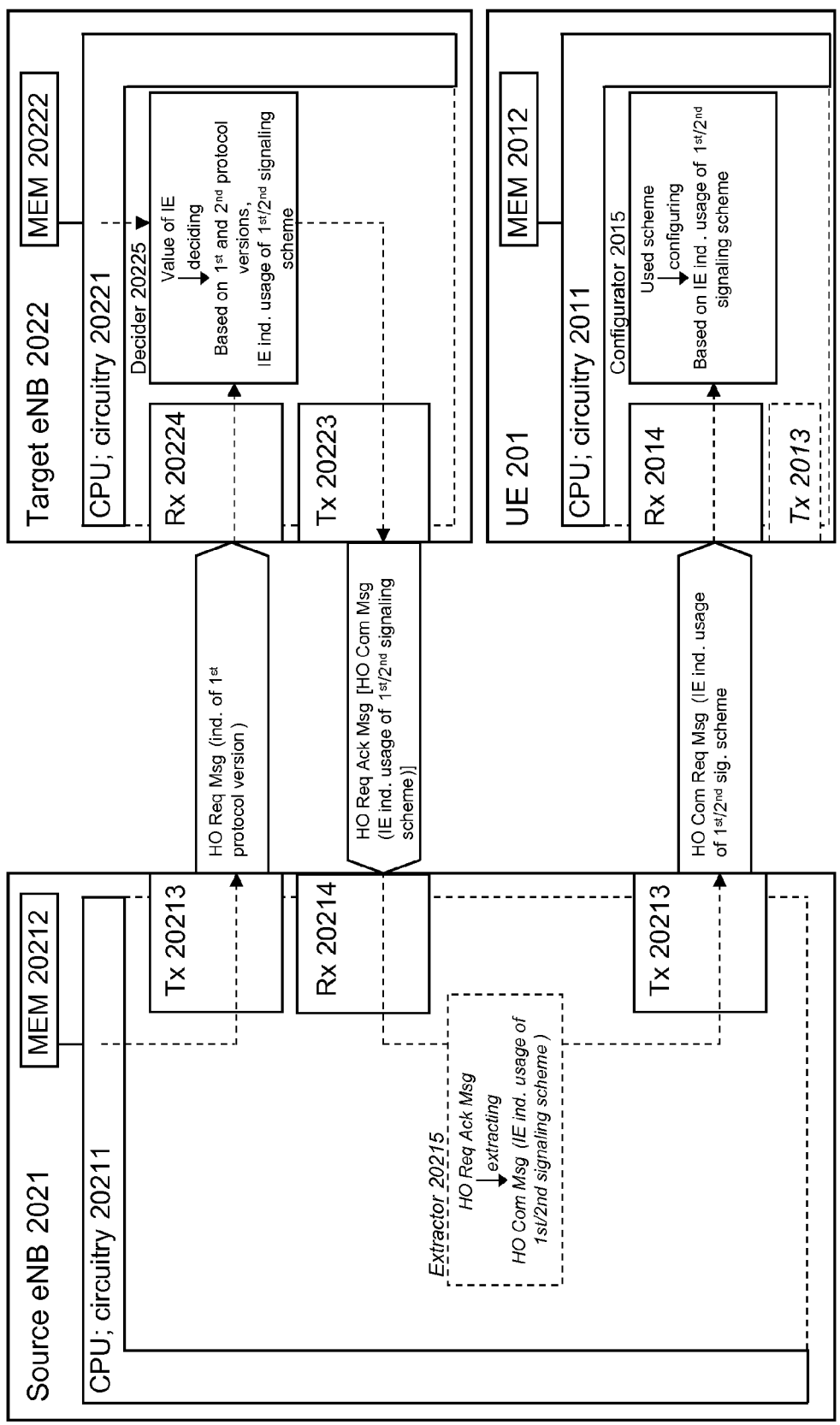
FIG. 2 shows apparatuses for deciding on a signaling scheme for handover according to the example of the present invention.

FIG. 2 shows apparatuses (e.g. the UE 201, the source eNB 2021 and the target eNB 2022) for deciding on a signaling scheme for handover according to the example of the present invention. Within FIG. 2, for ease of description, means or portions which may provide main functionalities are depicted with solid functional blocks or arrows and/or a normal font, while means or portions which may provide optional functions are depicted with dashed functional blocks or arrows and/or an italic font.

The UE 201 may comprise a CPU (or circuitry) 2011, a memory 2012, an optional transmitter (or means for transmitting) 2013, a receiver (or means for receiving) 2014 and a configurator (or means for configuring) 2015.

The source eNB 2021 may comprise a CPU (or circuitry) 20211, a memory 20212, a transmitter (or means for transmitting) 20213, a receiver (or means for receiving) 20214 and an optional extractor (or means for extracting) 20215.

The target eNB 2022 may comprise a CPU (or circuitry) 20221, a memory 20222, a transmitter (or means for transmitting) 20223, a receiver (or means for receiving) 20224 and a decider (or means for deciding) 20225.

As indicated by the dashed extensions of the functional blocks of the CPU 2011, 20211 or 20221, the means for configuring 2015, the means for extracting 20215 and the means for deciding 20225 (and the means for transmitting 2013 and means for receiving 2014 of the UE 201, the means for transmitting 20213 and means for receiving 20214 of the source eNB 2021 as well as the means for transmitting 20223 and means for receiving 20224 of the target eNB 2022) may be functionalities running on the CPU 2011, 20211 or 20221 of the UE 201 and/or source and target eNBs 2021, 2022, or may alternatively be separate functional entities or means.

The CPUs 20x1 (wherein x=1, 21 and/or 22) may respectively be configured, for example by software residing in the memory 20x2, to process various data inputs and to control the functions of the memories 20x2, the means for transmitting 202x3 and the means for receiving 20x4 (as well as the means for configuring 2015 of the UE 201, the means for extracting 20215 and the means for deciding 20225 of the target eNB 2022). The memories 20x2 may serve e.g. for storing code means for carrying out e.g. the methods according to the example of the present invention, when run e.g. on the CPUs 20x1. It is to be noted that the means for transmitting 20x3 and the means for receiving 20x4 may alternatively be provided as respective integral transceivers. It is further to be noted that the transmitters/receivers may be implemented i) as physical transmitters/receivers for transceiving e.g. via the air interface (e.g. between the UE 201 and the source entity 2021), ii) as routing entities e.g. for transmitting/receiving data packets e.g. in a PS (packet switching) network (e.g. between the source eNB 2021 and the target eNB 2022 when disposed as separate network entities), iii) as functionalities for writing/reading information into/from a given memory area (e.g. in case of shared/common CPUs or memories e.g. of the source eNB 2021 and the target eNB 2022 when disposed as an integral network entity), or iv) as any suitable combination of i) to iii).

Further, as shown in FIG. 2, e.g. the means for transmitting 20213 of the source eNB 2021 may perform transmitting, in a handover request message, an indication (e.g. enumerated information element) of a first protocol version (e.g. RRC protocol version of the source eNB 2021). Then, e.g. the means for receiving 20224 of the target eNB 2022 may perform receiving, in the handover request message, the indication of a first protocol version.

For example, the means for deciding 20225 of the target eNB 2022 may perform deciding, based on the received indication (e.g. RRC indication) of the first protocol version and a second protocol version (e.g. RRC protocol version of the target eNB 2022), on a value of an information element (e.g. one bit) comprised in a handover request acknowledgement message (e.g. RRC connection reconfiguration message which may be encapsulated in a handover request acknowledgement message) to be transmitted, the information element indicating usage of one of a first signaling scheme (e.g. delta signaling) and a second signaling scheme (e.g. full signaling) different from the first signaling scheme.

And, e.g. the means for transmitting 20223 of the target eNB 2022 may perform transmitting the handover request acknowledgement message (which may contain RRC Connection Reconfiguration message) comprising the information element indicating usage of the one of the first and second signaling (e.g. delta signaling or full signaling) schemes. Accordingly, e.g. the means for receiving 20214 of the source eNB 2021 may perform receiving, responsive to the transmitting performed by the means for transmitting 20213, the handover request acknowledgement message (e.g. containing RRC Connection Reconfiguration message) comprising the information element indicating usage of one of the first signaling scheme and the second signaling scheme, the usage of the one of the first and second signaling schemes having been decided based on the first protocol version and the external second protocol version.

Optionally, e.g. the means for extracting 20215 of the source eNB 2021 may perform extracting a handover command message from the received handover request acknowledgement message, the handover command message comprising the information element.

Then, optionally, e.g. the means for transmitting 20213 of the source eNB 2021 may perform transmitting, after the receiving, the handover request acknowledgement message (e.g. RRC Connection Reconfiguration message) to a user equipment (e.g. UE 201).

Finally, e.g. the means for receiving 2014 of the UE 201 may perform receiving the handover command message comprising the information element. And, e.g. the means for configuring 2015 of the UE 201 may perform configuring according to the first or the second signaling scheme indicated by the information element.

As for developments pertaining to the target eNB 2022, the means for deciding 20225 may be configured to perform during a handover preparation. Further, the indication of the first protocol version (e.g. RRC protocol version of the source eNB 2021) may be comprised in a radio resource control container, or may be signaled in an X2/S1 application signaling protocol.

As for developments pertaining to both the source eNB 2021 and the target eNB 2022, the first signaling scheme may utilize a radio resource control container defined in radio resource control specification (e.g. handover preparation information messages). In that case, the information element may be set to affirmative. Further in this case, the first protocol version (e.g. RRC protocol version of the source eNB 2021) may be higher than the second protocol version (e.g. RRC protocol version of the target eNB 2022). Alternatively, the second signaling scheme may utilize a message defined in X2 application protocol specification (e.g. handover request message) or S1 application protocol specification. (e.g. handover required message) In that case, the information element may be set to non-affirmative. Further in this case, the first protocol version may be equal to or lower than the second protocol version. However, the same information should be transferred from the source eNB 2021 to the target eNB 2022 regardless the signaling scheme. Further, the protocol version may be constituted by a protocol release. In addition, the information element may be constituted by at least one bit. Still further, the handover request acknowledgement message may be constituted by or may encapsulate a radio resource control connection reconfiguration message. Moreover, the first protocol may be constituted by a radio resource control protocol of a handover source entity, while the indication of the first protocol version may be an enumerated information element. Further, the second protocol may constituted by a radio resource control protocol of a handover target entity. Finally, the handover command messages of full configuration or of delta configuration may be constituted by radio resource control connection reconfiguration messages, while the radio resource control container may be constituted by a handover preparation information message.

Furthermore, at least one of, or more of the above-described means for transmitting 20213, 20223, means for receiving 20214, 20224, means for configuring 2015, means for extracting 20215 and means for deciding 20225 as well as the UE 201, source eNB 2021 and the target eNB 2022, or the respective functionalities carried out, may be implemented as a chipset, module or subassembly.

Finally, the example of present invention also relates to a system which may comprise the source eNB 2021, the target eNB 2022 and, the UE 201 according to the above-described example of the present invention.

Figure 3:
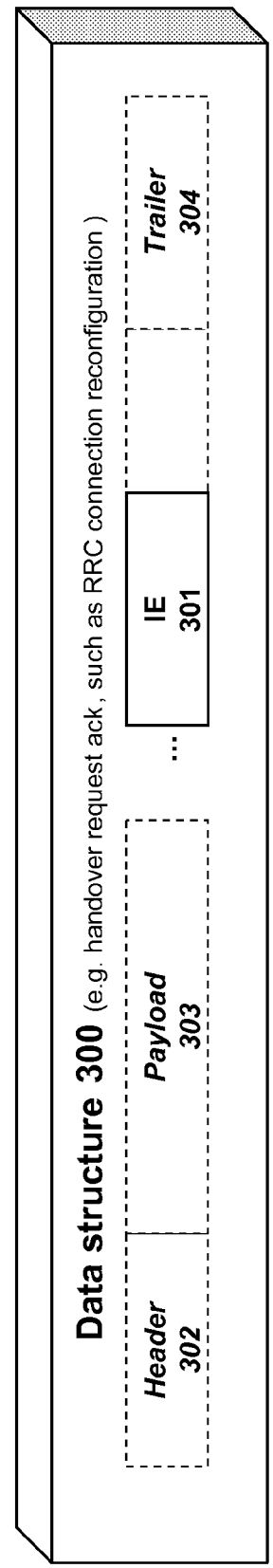
FIG. 3 shows a data structure for deciding on a signaling scheme for handover according to the example of the present invention.

FIG. 3 shows a data structure 300 for deciding on a signaling scheme for handover according to the example of the present invention.

As shown in FIG. 3, the data structure 300 may comprise an information element 301 indicating usage of one of the first signaling scheme (e.g. delta signaling scheme) and the second signaling scheme (e.g. full signaling scheme), the usage of the one of the first and second signaling schemes having been decided based on the first protocol version (e.g. RRC protocol version of the source eNB 2021 signaled e.g. during handover preparation to the target eNB 2021) and the external second protocol version (e.g. the RRC protocol version which the target eNB 2022 is configured to support).

Further, the data structure may comprise an optional header 302, an optional payload section 303 and an optional trailer 304.

As for developments pertaining to the data structure, the data structure may be constituted by a handover request acknowledgement message. Further, the first signaling scheme may utilize a radio resource control container defined in radio resource control specification (e.g. handover preparation information messages). In that case, the information element may be set to affirmative. Further in this case, the first protocol version (e.g. RRC protocol version of the source eNB 2021) may be higher than the second protocol version (e.g. RRC protocol version of the target eNB 2022). Alternatively, the second signaling scheme may utilize a message defined in X2 application protocol specification (e.g. handover request message) or S1 application protocol specification. (e.g. handover required message) In that case, the information element may be set to non-affirmative. Further in this case, the first protocol version may be equal to or lower than the second protocol version. However, the same information should be transferred from the source eNB 2021 to the target eNB 2022 regardless the signaling scheme. Further, the protocol version may be constituted by a protocol release. In addition, the information element may be constituted by at least one bit. Still further, the handover request acknowledgement message may be constituted by or may encapsulate a radio resource control connection reconfiguration message. Moreover, the first protocol may be constituted by a radio resource control protocol of a handover source entity, while the indication of the first protocol version may be an enumerated information element. Further, the second protocol may constituted by a radio resource control protocol of a handover target entity. Finally, the handover command messages of full configuration or of delta configuration may be constituted by radio resource control connection reconfiguration messages, while the radio resource control container may be constituted by a handover preparation information message.

Without being restricted to the details following in this section, the examples of the present invention may be summarized as follows:

For example, if a new channel quality indicator (CQI) reporting parameter is defined in Rel-9 and the UE is configured with the new CQI reporting parameter in the Rel-9 source eNB, this new CQI reporting parameter should be released upon handover to Rel-8 eNB. However, as the Rel-8 eNB does not support this functionality, it will not have any means to release this functionality nor can it properly interact with the UE that continues using that functionality.

Accordingly, considerations are made on how to cope with the handover (HO) when a source eNB and a target eNB are using e.g. different protocol versions or releases. Basically, the example of the invention provides a mechanism to indicate which RRC (radio resource control) protocol version (release) is used in the source eNB, and therefore a new parameter may be added e.g. to a Handover Preparation Information message, and based on that, the target eNB may be able to make a decision whether the full or delta signaling is needed to successful HO completion and to indicate it to the UE. In other words, this means that this indicator may tell a UE (user equipment) if the target eNB uses delta or full configuration method, and means a signaling of a certain RRC Release version from the source eNB to the target eNB during handover preparation for enabling the target eNB to decide which method is or should be used. Delta signaling may be supported if the target eNB RRC protocol version is equal or newer than the one which the source eNB is using.

To use the full signaling, it is proposed to include e.g. one bit for indicating e.g. in the RRC connection reconfiguration message in Rel-8 or onward. Thus, in case the "full signaling Indicator" is set to "yes", the UE may clearly know that the RRC connection reconfiguration message is not based on the delta signaling. As this full signaling may be required when the source eNB's RRC protocol release is higher than the target eNB's RRC protocol release, having "full signaling indicator" in Rel-8 onward may solve the problem.

To decide whether the "full signaling indicator" should be set to "yes" or not, the target eNB may make a decision e.g. during HO preparation, because this information element may be included e.g. in the RRC connection reconfiguration message and may be sent to the source eNB e.g. in the Handover Request Acknowledge message.

In other words, it is proposed that the source eNB may indicate the release of RRC protocol of the source eNB to the target eNB during the handover preparation. This can be included in the RRC container or can be signaled over X2 and/or over S1 in the X2 and/or S1 application protocol. After the target eNB learns the release of RRC protocol which the source eNB is using, and if the release is higher than the one the target eNB is using or the target eNB does not understand the release (e.g. because the source eNB RRC protocol release indicator is higher than what the target eNB is supporting), the target eNB may use the full signaling. If the source eNB RRC protocol release is lower or equal than the target eNB RRC protocol release, the target eNB can use the so-called delta signaling.

In other words, the signaling of the first protocol version may be performed e.g. by an RRC container or a X1/S1 message. The signaling itself may not relate to delta or full signaling. The source eNB may indicate e.g. its RRC protocol release via the RRC container (e.g. handover preparation information message) or the X1/S1 message. (Handover Request message/Handover Required message) And gradually, the RRC container may be encapsulated in the X1/S2 message. Thus, the Handover Command may be a RRC message and the Handover Request Acknowledgement message may be X2 message. The handover command may be encapsulated in the Handover Request acknowledge message, and the source eNB may transmit the handover command to the UE, because the handover command message may be the form which the UE can process. Finally, full/delta signaling may be related to that handover command message, which constructed in the target eNB and is sent to the UE via the source eNB. Accordingly, a one bit indicator in the same message (i.e. handover command message) may be used so that the UE can configure parameters properly.

Further Examples

For the purpose of the present invention as described herein above, it should be noted that a circuitry may refer to at least one of, or hybrids of the following:
  (a) to pure hardware circuit implementations (such as implementations purely in analog and/or digital circuitry), and
  (b) to combinations of circuits and software (and/or firmware), such as (as applicable):
    (i) a combination of processor(s), or
    (ii) portions of processor(s)/software (including digital signal processor(s)), software and memory (or memories) that work together to cause an apparatus as defined hereinabove to perform various functions, and
  (c) to circuits, such as (micro)processor(s) or a portion of (a) (micro)processor(s) that require software and/or firmware for operation even if the software or firmware is not physically present;

a processor may be any processing unit, such as CPU, arithmetic and logic unit (ALU), microprocessor unit (MPU), digital signal processor (DSP) etc., be it a single core processor, dual core processor or multi-core processor;

a program may be embodied by or on any computer program (product), computer readable medium, processor(s), memory (or memories), circuitry, circuits, random access memory (RAM), read-only memory (ROM)

and/or data structure(s), be it e.g. as compiled/non-compiled program (source) code, executable object, (meta) file or the like;

an access technology may be any technology by means of which a user equipment can access an access network (or base station, respectively). Any present or future technology, such as WiMAX (Worldwide Interoperability for Microwave Access) or WLAN (Wireless Local area Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the internet protocol (IP). The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at a network element or terminal (as examples of devices, apparatuses and/or modules thereof, or as examples of entities including apparatuses, circuitries and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s)/circuitry(ies) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units, circuitries or means (e.g. the above-defined apparatuses, or any one of their respective means) can be implemented as individual devices, units or means, but this does not exclude that they are implemented in a distributed fashion throughout the system, as long as the functionality of the device, unit. circuitry or means is preserved;

an apparatus may be represented by a semiconductor chip, a chipset, a (hardware) module comprising such chip or chipset, or a circuitry; this, however, does not exclude the possibility that a functionality of an apparatus, module or circuitry, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

According to an example of the present invention, in a first aspect, this object is for example achieved by a method comprising:

receiving, in a handover request message, an indication of a first protocol version;

deciding, based on the received indication of the first protocol version and a second protocol version, on a value of an information element comprised in a handover request acknowledgement message to be transmitted, the information element indicating usage of one of a first signaling scheme and a second signaling scheme different from the first signaling scheme; and transmitting the handover request acknowledgement message comprising the information element indicating usage of the one of the first and second signaling scheme.

According to further refinements of the example of the present invention as defined under the above first aspect, the deciding is performed during a handover preparation.

According to an example of the present invention, in a second aspect, this object is for example achieved by a method comprising:

transmitting, in a handover request message, an indication of a first protocol version; and receiving, responsive to the transmitting, a handover request acknowledgement message comprising an information element indicating usage of one of a first signaling scheme and a second signaling scheme different from the first signaling scheme, the usage of the one of the first and second signaling schemes having been decided based on the first protocol version and an external second protocol version.

According to further refinements of the example of the present invention as defined under the above second aspect, the method further comprises extracting an handover command message from the received handover request acknowledgement message, the handover command message comprising the information element;

the method further comprises transmitting, after the receiving, the handover command message to a user equipment.

According to further refinements of the example of the present invention as defined under the above first and second aspects, the indication of the first protocol version is comprised in a radio resource control container;

the indication of the first protocol version is signaled in an X2/S1 application signaling protocol.

According to an example of the present invention, in a third aspect, this object is for example achieved by a method comprising:

receiving a handover command message comprising an information element indicating usage of one of a first signaling scheme and a second signaling scheme different from the first signaling scheme, the usage of the one of the first and second signaling schemes having been decided based on an external first protocol version and an external second protocol version; and configuring according to one of the first and second signaling schemes indicated by the information element.

According to further refinements of the example of the present invention as defined under the above first to third aspects, the first signaling scheme utilizes handover command messages of full configuration;
the information element is set to affirmative;
the first protocol version is higher than the second protocol version;
the second signaling scheme utilizes handover command messages of reduced configuration;
the information element is set to non-affirmative;
the first protocol version is equal to or lower than the second protocol version;
the protocol version is constituted by a protocol release;
the information element is constituted by at least one bit;
the handover request acknowledgement message is constituted by or encapsulates a radio resource control connection reconfiguration message;
the first protocol is constituted by a radio resource control protocol of a handover source entity;
the indication of the first protocol version is an enumerated information element;
the second protocol is constituted by a radio resource control protocol of a handover target entity;
the handover command messages of full configuration are constituted by radio resource control connection reconfiguration messages;
the handover command messages of delta configuration are constituted by radio resource control connection reconfiguration messages;
the radio resource control container is constituted by an handover preparation information message.

According to an example of the present invention, in a fourth aspect, this object is for example achieved by an apparatus comprising:

means for receiving, in a handover request message, an indication of a first protocol version;
means for deciding, based on the received indication of the first protocol version and a second protocol version, on a value of an information element comprised in a handover request acknowledgement message to be transmitted, the information element indicating usage of one of a first signaling scheme and a second signaling scheme different from the first signaling scheme; and
means for transmitting the handover request acknowledgement message comprising the information element indicating usage of the one of the first and second signaling schemes.

According to further refinements of the example of the present invention as defined under the above fourth aspect, the means for deciding is configured to perform during a handover preparation.

According to an example of the present invention, in a fifth aspect, this object is for example achieved by an apparatus comprising:

means for transmitting, in a handover request message, an indication of a first protocol version; and
means for receiving, responsive to the means for transmitting, a handover request acknowledgement message comprising an information element indicating usage of one of a first signaling scheme and a second signaling scheme different from the first signaling scheme, the usage of the one of the first and second signaling schemes having been decided based on the first protocol version and an external second protocol version.

According to further refinements of the example of the present invention as defined under the above fifth aspect, the apparatus further comprises means for extracting an handover command message from the received handover request acknowledgement message, the handover command message comprising the information element;
the apparatus further comprises means for transmitting, after the receiving, the handover command message to a user equipment.

According to further refinements of the example of the present invention as defined under the above fourth and fifth aspects, the indication of the first protocol version is comprised in a radio resource control container;
the indication of the first protocol version is configured to be signaled in an X2/S1 application signaling protocol.

According to an example of the present invention, in a sixth aspect, this object is for example achieved by an apparatus comprising:

means for receiving a handover command message comprising an information element indicating usage of one of a first signaling scheme and a second signaling scheme different from the first signaling scheme, the usage of the one of the first and second signaling schemes having been decided based on an external first protocol version and an external second protocol version; and
means for configuring according to one of the first and second signaling schemes indicated by the information element.

According to further refinements of the example of the present invention as defined under the above fourth to sixth aspects, the first signaling scheme is configured to utilize handover command messages of full configuration;
the information element is configured to be set to affirmative;
the first protocol version is higher than the second protocol version;
the second signaling scheme is configured to utilize handover command messages of reduced configuration;
the information element is configured to be set to non-affirmative;
the first protocol version is equal to or lower than the second protocol version;
the protocol version is constituted by a protocol release;
the information element is constituted by at least one bit;
the handover request acknowledgement message is constituted by or encapsulates a radio resource control connection reconfiguration message;
the first protocol is constituted by a radio resource control protocol of a handover source entity;
the indication of the first protocol version is an enumerated information element;
the second protocol is constituted by a radio resource control protocol of a handover target entity;
the handover command messages of full configuration are constituted by radio resource control connection reconfiguration messages;
the handover command messages of delta configuration are constituted by radio resource control connection reconfiguration messages;

the radio resource control container is constituted by a handover preparation information message;

at least one, or more of means for receiving, means for deciding, means for transmitting, means for extracting, means for configuring and the apparatus is implemented as a chipset, module or subassembly.

According to an example of the present invention, in a seventh aspect, this object is for example achieved by an apparatus comprising:

a receiver configured to receive, in a handover request message, an indication of a first protocol version;

a decider configured to decided, based on the received indication of the first protocol version and a second protocol version, on a value of an information element comprised in a handover request acknowledgement message to be transmitted, the information element indicating usage of one of a first signaling scheme and a second signaling scheme different from the first signaling scheme; and a transmitter configured to transmit the handover request acknowledgement message comprising the information element indicating usage of the one of the first and second signaling schemes.

According to further refinements of the example of the present invention as defined under the above seventh aspect, the decider is configured to perform during a handover preparation.

According to an example of the present invention, in a eighth aspect, this object is for example achieved by an apparatus comprising:

a transmitter configured to transmit, in a handover request message, an indication of a first protocol version; and a receiver configured to receive, responsive to the transmitter, a handover request acknowledgement message comprising an information element indicating usage of one of a first signaling scheme and a second signaling scheme different from the first signaling scheme, the usage of the one of the first and second signaling schemes having been decided based on the first protocol version and an external second protocol version.

According to further refinements of the example of the present invention as defined under the above eighth aspect, the apparatus further comprises an extractor configured to extract an handover command message from the received handover request acknowledgement message, the handover command message comprising the information element;

the apparatus further comprises a transmitter configured to transmit, after the receiving, the handover command message to a user equipment.

According to further refinements of the example of the present invention as defined under the above seventh and eighth aspects, the indication of the first protocol version is comprised in a radio resource control container;

the indication of the first protocol version is configured to be signaled in an X2/S1 application signaling protocol.

According to an example of the present invention, in a ninth aspect, this object is for example achieved by an apparatus comprising:

a receiver configured to receive a handover command message comprising an information element indicating usage of one of a first signaling scheme and a second signaling scheme different from the first signaling scheme, the usage of the one of the first and second signaling schemes having been decided based on an external first protocol version and an external second protocol version; and a configurator configured to configure according to one of the first and second signaling schemes indicated by the information element.

According to further refinements of the example of the present invention as defined under the above seventh to ninth aspects, the first signaling scheme is configured to utilize handover command messages of full configuration;

the information element is configured to be set to affirmative;

the first protocol version is higher than the second protocol version;

the second signaling scheme is configured to utilize handover command messages of reduced configuration;

the information element is configured to be set to non-affirmative;

the first protocol version is equal to or lower than the second protocol version;

the protocol version is constituted by a protocol release;

the information element is constituted by at least one bit;

the handover request acknowledgement message is constituted by or encapsulates a radio resource control connection reconfiguration message;

the first protocol is constituted by a radio resource control protocol of a handover source entity;

the indication of the first protocol version is an enumerated information element;

the second protocol is constituted by a radio resource control protocol of a handover target entity;

the handover command messages of full configuration are constituted by radio resource control connection reconfiguration messages;

the handover command messages of delta configuration are constituted by radio resource control connection reconfiguration messages;

the radio resource control container is constituted by a handover preparation information message;

at least one, or more of the receiver, the decider, the extractor, the configurator and the apparatus is implemented as a chipset, module or subassembly.

According to an example of the present invention, in a tenth aspect, this object is for example achieved by a system comprising:

an apparatus according to the above fourth or seventh aspects;

an apparatus according to the above fifth or eighth aspects; and an apparatus according to the above sixth or ninth aspects.

According to an example of the present invention, in an eleventh aspect, this object is for example achieved by a computer program product comprising code means for performing a method according to any one of the above first to third aspects when run on a processing means or module.

According to an example of the present invention, in a twelfth aspect, this object is for example achieved by a computer program comprising code means for performing, when run on a processing means or module, a method comprising:

receiving, in a handover request message, an indication of a first protocol version;

deciding, based on the received indication of the first protocol version and a second protocol version, on a value of an information element comprised in a handover request acknowledgement message to be transmitted, the information element indicating usage of one of a first signaling scheme and a second signaling scheme different from the first signaling scheme; and transmitting the handover request acknowledgement message comprising the information element indicating usage of the one of the first and second signaling scheme.

According to an example of the present invention, in a thirteenth aspect, this object is for example achieved by a computer program comprising code means for performing, when run on a processing means or module, a method comprising:

transmitting, in a handover request message, an indication of a first protocol version; and receiving, responsive to the transmitting, a handover request acknowledgement message comprising an information element indicating usage of one of a first signaling scheme and a second signaling scheme different from the first signaling scheme, the usage of the one of the first and second signaling schemes having been decided based on the first protocol version and an external second protocol version.

According to an example of the present invention, in a fourteenth aspect, this object is for example achieved by a computer program comprising code means for performing, when run on a processing means or module, a method comprising:

receiving a handover command message comprising an information element indicating usage of one of a first signaling scheme and a second signaling scheme different from the first signaling scheme, the usage of the one of the first and second signaling schemes having been decided based on an external first protocol version and an external second protocol version; and configuring according to one of the first and second signaling schemes indicated by the information element.

According to an example of the present invention, in a fifteenth aspect, this object is for example achieved by a data structure comprising:

an information element comprising an information element indicating usage of one of a first signaling scheme and a second signaling scheme different from the first signaling scheme, the usage of the one of the first and second signaling schemes having been decided based on the first protocol version and an external second protocol version.

According to further refinements of the example of the present invention as defined under the above fifteenth aspect,
the protocol version is constituted by a protocol release;
the information element is constituted by at least one bit;
the data structure is constituted by a handover request acknowledgement message;
the handover request acknowledgement message is constituted by or encapsulates a radio resource control connection reconfiguration message;
the first protocol is constituted by a radio resource control protocol of a handover source entity;
the indication of the first protocol version is an enumerated information element;
the second protocol is constituted by a radio resource control protocol of a handover target entity;
the handover command messages of full configuration are constituted by radio resource control connection reconfiguration messages;
the handover command messages of delta configuration are constituted by radio resource control connection reconfiguration messages;
the radio resource control container is constituted by a handover preparation information message.

Although the present invention has been described herein before with reference to particular embodiments thereof, the present invention is not limited thereto and various modification can be made thereto.

The invention claimed is:

1. A method, comprising:
receiving, in a handover request message, an indication of a first protocol version;
deciding, based on the received indication of the first protocol version and a second protocol version, on a value of an information element comprised in a handover request acknowledgement message to be transmitted, the information element indicating usage of one of a first signaling scheme and a second signaling scheme different from the first signaling scheme; and
transmitting the handover request acknowledgement message comprising the information element indicating usage of the one of the first and second signaling scheme.

2. The method according to claim 1, wherein the deciding is performed during a handover preparation.

3. The method according to claim 1, wherein the indication of the first protocol version is comprised in a radio resource control container.

4. The method according to any claim 1, wherein the indication of the first protocol version is signaled in an X2/S1 application signaling protocol.

5. The method according to claim 1, wherein the first signaling scheme utilizes handover command messages of full configuration.

6. The method according to claim 5, wherein the information element is set to affirmative.

7. The method according to claim 5, wherein the first protocol version is higher than the second protocol version.

8. The method according to claim 1, wherein the second signaling scheme utilizes handover command messages of reduced configuration.

9. The method according to claim 8, wherein the information element is set to non-affirmative.

10. The method according to claim 8, wherein the first protocol version is equal to or lower than the second protocol version.

11. The method according to claim 1, wherein at least one of the following applies:
the protocol version is constituted by a protocol release;
the information element is constituted by at least one bit;
the handover request acknowledgement message is constituted by or encapsulates a radio resource control connection reconfiguration message;
the first protocol is constituted by a radio resource control protocol of a handover source entity;
the indication of the first protocol version is an enumerated information element;
the second protocol is constituted by a radio resource control protocol of a handover target entity;
the handover command messages of full configuration are constituted by radio resource control connection reconfiguration messages;
the handover command messages of delta configuration are constituted by radio resource control connection reconfiguration messages; and
the radio resource control container is constituted by an handover preparation information message.

12. A computer program product comprising code means for performing a method according to claim 1 when run on a processing means or module.

13. A method, comprising:
transmitting, in a handover request message, an indication of a first protocol version; and
receiving, responsive to the transmitting, a handover request acknowledgement message comprising an information element indicating usage of one of a first signaling scheme and a second signaling scheme different from the first signaling scheme, the usage of the one of the first and second signaling schemes having been decided based on the first protocol version and an external second protocol version.

14. The method according to claim 13, further comprising:
extracting an handover command message from the received handover request acknowledgement message, the handover command message comprising the information element.

15. The method according to claim 13, further comprising:
transmitting, after the receiving, the handover command message to a user equipment.

16. A method, comprising:
receiving a handover command message comprising an information element indicating usage of one of a first signaling scheme and a second signaling scheme different from the first signaling scheme, the usage of the one of the first and second signaling schemes having been decided based on an external first protocol version and an external second protocol version; and
configuring according to one of the first and second signaling schemes indicated by the information element.

17. An apparatus, comprising:
means for receiving, in a handover request message, an indication of a first protocol version;
means for deciding, based on the received indication of the first protocol version and a second protocol version, on a value of an information element comprised in a handover request acknowledgement message to be transmitted, the information element indicating usage of one of a first signaling scheme and a second signaling scheme different from the first signaling scheme; and
means for transmitting the handover request acknowledgement message comprising the information element indicating usage of the one of the first and second signaling schemes.

18. The apparatus according to claim 17, wherein the means for deciding is configured to perform during a handover preparation.

19. The apparatus according to claim 17, wherein the indication of the first protocol version is comprised in a radio resource control container.

20. The apparatus according to claim 17, wherein the indication of the first protocol version is configured to be signaled in an X2/S1 application signaling protocol.

21. The apparatus according to claim 17, wherein the first signaling scheme is configured to utilize handover command messages of full configuration.

22. The apparatus according to claim 21, wherein the information element is configured to be set to affirmative.

23. The apparatus according to claim 21, wherein the first protocol version is higher than the second protocol version.

24. The method according to claim 17, wherein the second signaling scheme is configured to utilize handover command messages of reduced configuration.

25. The apparatus according to claim 24, wherein the information element is configured to be set to non-affirmative.

26. The apparatus according to claim 24, wherein the first protocol version is equal to or lower than the second protocol version.

27. The apparatus according to claim 17, wherein at least one of the following applies:
the protocol version is constituted by a protocol release;
the information element is constituted by at least one bit;
the handover request acknowledgement message is constituted by or encapsulates a radio resource control connection reconfiguration message;
the first protocol is constituted by a radio resource control protocol of a handover source entity;
the indication of the first protocol version is an enumerated information element;
the second protocol is constituted by a radio resource control protocol of a handover target entity;
the handover command messages of full configuration are constituted by radio resource control connection reconfiguration messages;
the handover command messages of delta configuration are constituted by radio resource control connection reconfiguration messages; and
the radio resource control container is constituted by a handover preparation information message.

28. The apparatus according to claim 17, wherein at least one, or more of means for receiving, means for deciding, means for transmitting, means for extracting, means for configuring and the apparatus is implemented as a chipset, module or subassembly.

29. An apparatus, comprising:
means for transmitting, in a handover request message, an indication of a first protocol version; and means for receiving, responsive to the means for transmitting, a handover request acknowledgement message comprising an information element indicating usage of one of a first signaling scheme and a second signaling scheme different from the first signaling scheme, the usage of the one of the first and second signaling schemes having been decided based on the first protocol version and an external second protocol version.

30. The apparatus according to claim 29, further comprising:
means for extracting an handover command message from the received handover request acknowledgement message, the handover command message comprising the information element.

31. The apparatus according to claim 29, further comprising means for transmitting, after the receiving, the handover command message to a user equipment.

32. An apparatus, comprising:
means for receiving a handover command message comprising an information element indicating usage of one of a first signaling scheme and a second signaling scheme different from the first signaling scheme, the usage of the one of the first and second signaling schemes having been decided based on an external first protocol version and an external second protocol version; and
means for configuring according to one of the first and second signaling schemes indicated by the information element.

* * * * *